United States Patent [19]

Bare

[11] 3,753,687
[45] Aug. 21, 1973

[54] A PROCESS OF TREATING IRON OXIDE PELLETS WITH A CHLORIDE AND PRODUCING IRON PELLETS THEREFROM

[75] Inventor: Conrad B. Bare, Coopersburg, Pa.

[73] Assignee: Bethlehem Steel Corporation, Bethlehem, Pa.

[22] Filed: Dec. 7, 1970

[21] Appl. No.: 95,936

[52] U.S. Cl. .................................................. 75/33
[51] Int. Cl. ............................................ C21b 13/08
[58] Field of Search ............... 75/33, 26, 114, 111, 75/104

[56] References Cited
UNITED STATES PATENTS

| | | | |
|---|---|---|---|
| 1,858,274 | 5/1932 | Kern et al. ......................... | 75/3 X |
| 2,108,043 | 2/1938 | Crist .................................. | 75/10 |
| 2,888,341 | 5/1959 | Lawless et al. ................... | 75/3 |
| 3,068,090 | 12/1962 | Reed et al. ........................ | 75/33 |
| 3,180,725 | 4/1965 | Meyer et al. ..................... | 75/33 |
| 3,062,639 | 11/1962 | Sterling ............................. | 75/26 |
| 2,775,517 | 12/1956 | Mancke ............................. | 75/104 |
| 2,305,829 | 12/1942 | Pieper ............................... | 75/111 |
| 1,330,846 | 2/1920 | Clapp ................................ | 75/33 |
| 2,085,178 | 6/1937 | Acken ............................... | 75/33 |
| 2,406,577 | 8/1946 | Alessandroni et al. ........... | 75/114 X |
| 2,658,813 | 11/1953 | Whitehouse et al. ............. | 75/114 X |
| 3,138,451 | 6/1964 | Gerlach ............................. | 75/33 |
| 3,511,718 | 5/1970 | Segura .............................. | 75/33 X |

Primary Examiner—L. Dewayne Rutledge
Assistant Examiner—M. J. Andrews
Attorney—Joseph J. O'Keefe

[57] ABSTRACT

Balled iron ore concentrates which have been soda-roasted and leached to extract non-ferrous metal values, such as vanadium and chromium, therefrom are soaked in an aqueous solution of ferrous chloride ($FeCl_2$) or waste hydrochloric acid pickle liquor or calcium chloride ($CaCl_2$) for a time sufficient to saturate the partially hardened pellets. The pellets, a carbonaceous reducing agent and a desulfurizing agent are charged into a furnace. The charged materials are heated to a temperature, for example, about 2,050° F., for a time in a reducing atmosphere to reduce a substantial portion of the iron oxide therein to metallic iron.

5 Claims, No Drawings

A PROCESS OF TREATING IRON OXIDE PELLETS WITH A CHLORIDE AND PRODUCING IRON PELLETS THEREFROM

BACKGROUND OF THE INVENTION

This invention is directed to a process for producing metallized iron pellets from iron ore concentrates which have been mixed with an alkali metal compound, balled, roasted and leached to extract non-ferrous metal values therefrom.

Iron ore concentrates which contain non-ferrous metal values, for example, vanadium and chromium, are mixed with an alkali metal compound and are agglomerated. The agglomerates, which can be in the form of balls, are roasted and leached to extract the non-ferrous metal values therefrom. When roasted, the agglomerates are partially hardened to thereby form pellets. During subsequent heating of the soda-roasted and leached pellets in a reducing environment to produce metallized pellets therefrom, a considerable portion, for example, about 50 percent of the weight of the pellets degrades into fines. Although the fines so generated can be used as charge material to a metallurgical furnace, the fine size of the particles makes them difficult to transport and to charge into the furnace. The fine size of the particles also results in a loss of the fines to the atmosphere when charged into a furnace. Their use, therefore, can become a pollution problem. The fines can also fill the interstices between the larger particles in the furnace, thereby "choking" the furnace. It is, therefore, the generally accepted practice to re-agglomerate the fines to produce relatively large particles therefrom prior to charging into a furnace. Because only about 50 percent of the total soda-roasted and leached pellets which are treated to metallize the iron oxide therein are recovered from the metallization process, it becomes economically less attractive to metallize such pellets.

It is the primary object of this invention to provide an economically attractive process to produce metallized iron pellets from balled iron ore concentrates which have been soda-roasted and leached.

It is another object of this invention to provide a process to produce metallized iron pellets from soda-roasted and leached iron oxide pellets in which the degradation of the pellets during metallization is substantially decreased.

It is another object of this invention to produce metallized iron pellets from soda-roasted and leached iron oxide pellets in which a higher yield of metallized iron pellets than heretofore attainable is realized.

It is an object of this invention to provide a process to produce metallized iron pellets from soda-roasted and leached pellets in which said soda-roasted and leached iron oxide pellets are soaked in an aqueous solution of a chloride, for example ferrous chloride, calcium chloride or hydrochloric acid waste pickle liquor prior to metallizing whereby the amount of pellets realized from metallization is greater than heretofore attainable.

SUMMARY OF THE INVENTION

Iron oxide pellets which have been soda-roasted and leached to recover non-ferrous metal values therefrom are soaked in an aqueous solution containing chlorides. The soaked pellets, a carbonaceous reducing agent and a desulfurizing agent are charged into a furnace. The charged materials are heated to a temperature for a time in a reducing atmosphere to reduce a substantial portion of the iron oxide therein to metallic iron.

PREFERRED EMBODIMENT OF THE INVENTION

I have found a process whereby the yield of the desired size of metallized iron pellets made from soda-roasted and leached iron oxide pellets can be substantially improved.

Iron ore concentrates which contain iron oxide and non-ferrous metal values, such as vanadium and chromium, are mixed with an alkali metal compound. The mix is balled. The balled material is roasted and leached to remove the non-ferrous metal therefrom. During roasting, the temperature of the balled material is raised to a temperature sufficiently high to cause at least partial hardening of the balls. Therefore, the soda-roasted and leached balled materials can be defined as iron oxide pellets. The soda-roasted and leached balled material will hereinafter be referred to as iron oxide pellets.

The iron oxide pellets are soaked in an aqueous solution of ferrous chloride ($FeCl_2$), calcium chloride ($CaCl_2$), or hydrochloric acid waste pickle liquor, which waste pickle liquor is essentially an aqueous solution of ferrous chloride. The soaked pellets, a solid carbonaceous reducing agent, for example, anthracite coal, coke, coke breeze, graphite, etc., and a desulfurizing agent, for example, dolomite $CaMg(CO_3)_2$, magnesium carbonate ($MgCO_3$), limestone ($CaCO_3$), calcium oxide (CaO) or magnesium oxide (MgO), are charged into a furnace, for example, a rotary kiln. The charged materials are heated to a temperature, for example, about 2,050° F., for a time, for example, three hours, to reduce a substantial portion of the iron oxide in the pellets to metallic iron in the final metallized pellets of the invention.

I have found that the iron oxide pellets can be soaked in an aqueous solution of about 15 percent to about 40 percent ferrous chloride or calcium chloride or hydrochloric acid waste pickle liquor of the same concentrations as above to produce the desired metallized pellets of the invention. A typical hydrochloric acid waste pickle liquor can contain about 25 percent ferrous chloride in aqueous solution. However, I prefer to use an aqueous solution of ferrous chloride within the ranges hereinbefore stated.

The soaked iron oxide pellets, an amount of a solid carbonaceous reducing agent and an amount of a desulfurizing agent are charged into a furnace. I prefer to use graphite or coke breeze as the solid carbonaceous reducing agent and calcium oxide (CaO) or magnesium oxide (MgO) as the desulfurizing agent. It will be understood that it is also within the scope of the invention that a gaseous reducing agent, for example, carbon monoxide, can be introduced into the furnace to achieve the metallization of the iron oxide in the pellets.

The materials charged into the furnace are heated to about 2,050° F. in the absence of air. A substantial portion of the iron oxide in the soaked pellets is reduced to metallic iron in the final pellets. The degree of metallization of the iron oxide is at least about 93 percent. Soaking the iron oxide pellets in the aqueous solution of ferrous chloride results in the addition of about 0.5 percent to about 1 percent iron to the final metallized pellets. Of course, if an aqueous solution of calcium chloride is used to soak the iron oxide pellets, the total iron in the final metallized pellets is diluted because calcium is retained as an oxide. The chlorine is vaporized and passes off as a chloride.

Metallization of the iron oxide in the soda-roasted and leached pellets can be obtained by heating the iron oxide pellets within a temperature range of about 1,800° F. to about 2,400° F. in a reducing environment for an appropriate time. Lower metallization temperatures require longer holding times at temperature to obtain the desired degree of metallization of about 93 percent in the final metallization pellets. Of course, higher temperatures require shorter time, however the problem of fusion at higher temperatures dictates the use of temperatures in the lower or middle portion of the temperature range. This is particularly true if the iron oxide pellets contain a flux which occurs when the pellets are soaked in an aqueous solution of calcium chloride. Commercially, it is unattractive to use the very low temperatures in the temperature range since excessively long holding times at temperature are required. I, therefore, use a temperature of about 1,900° F. to about 2,200° F. and prefer to use a temperature range of about 2,000° F. to 2,100° F.

I have found that the process herein described produces a higher yield of metallized pellets having a size of +¼ inch than has heretofore been attainable. Unexpectedly, the metallized pellets of the invention can be classified as a higher grade of pellets than heretofore produced since the amount of carbon which is picked up by the pellets is much less than pellets produced by prior art practice and the degree of metallization is relatively high. Metallized pellets produced by the instant process contain not more than about 2 percent carbon and generally about 1.00 percent to 1.75 percent carbon as compared to prior art pellets which contain about 6 percent to about 7 percent carbon. The total amount of iron in the metallized pellets is dependent upon the amount of iron oxide and gangue materials in the iron ore concentrate used to make the iron oxide-alkali metal compound balls.

A chart showing the comparison between pellets which have been soda-roasted and leached and heated in a reducing environment for metallization produced by a prior art process and pellets produced by the process of the invention follows:

| Sample (500 grams of moist soda-roasted and leached pellets) | Wt. of +¼ in. pellets produced, gms. | Percent | | | | |
| --- | --- | --- | --- | --- | --- | --- |
| | | Total Fe | Fe° | Fe°/Fe$^t$ | C | Na$_2$O |
| #1 (Prior art unsoaked pellets) | 190 | 87.9 | 83.1 | 94.5 | 7.0 | 0.46 |
| #2 (Pellets soaked in an aqueous solution containing 29.8% FeCl$_2$) | 279 | 95.5 | 93.0 | 97.4 | 1.3 | 0.07 |
| #3 (Pellets soaked in an aqueous solution containing 16.8% FeCl$_2$) | 287 | 95.8 | 91.6 | 95.7 | 1.2 | 0.07 |
| #4 (Pellets soaked in waste hydrochloric acid pickle liquor containing 25.3% FeCl$_2$) | 286 | 95.9 | 94.1 | 98.0 | 1.2 | 0.08 |
| #5 (Pellets soaked in an aqueous solution of 30% CaCl$_2$) | 312 | 91.1 | 86.8 | 95.3 | 1.7 | 0.05 |

Note that the total iron in Sample No. 1, the prior art pellets, was about 8 percent lower than the total iron in Samples No. 2, No. 3 and No. 4, which were produced from soaked iron oxide pellets. It follows that the amount of metallic iron in the prior art pellets is less than the amount of metallic iron in the pellets of the invention. The pick-up in carbon was about 6 percent more in the prior art pellets than in the treated pellets of the invention. The yield of pellets of a size greater than one-quarter inch was about 50 percent less in the prior art pellets than in the treated pellets of the invention. An added advantage in the pellets of the invention is that the alkali content is lowered to below about 0.10 percent whereas the alkali content in the prior art pellets is about 0.5 percent which amount is detrimental to furnace refractories.

In a specific example of the invention, about 500 gms. of iron oxide pellets containing about 5.0 percent moisture which on a dry basis contain 68.4 percent total iron and under 0.10 percent C were soaked in an aqueous solution containing about 30 percent ferrous chloride (FeCl$_2$). The pellets were soaked for four hours at 176° F. The pellets were removed from the solution and while wet were charged into a rotary kiln with 350 grams of graphite and 21 grams of magnesium oxide (MgO). The charged materials were heated to about 2,050° F. and held at that temperature for 3 hours. Nitrogen gas was passed through the kiln to exclude air therefrom and to prevent ingress of air during reduction. The charged materials were cooled to 110° F. and discharged from the furnace. The discharged materials were screened on a one-quarter inch screen to recover the metallized iron pellets. A total weight of 278.8 grams of pellets having a size of +¼ inch was produced. The pellets contained 95.5 percent total iron and 93 percent metallic iron. About 97.4 percent of the total iron in the pellets was metallized. The carbon content was 1.3 percent.

In another specific example of the invention about 500 grams of moist iron oxide pellets having the same analysis as in the first specific example were soaked in an aqueous solution containing about 17 percent ferrous chloride at 176° F. for 4 hours. The pellets were removed from the solution and were charged into a rotary kiln with 350 grams of graphite and 21 grams of magnesium oxide. The materials were heated to 2,050° F. and held at temperature for three hours. A reducing environment containing carbon monoxide was maintained by the presence of excess graphite in the kiln. The charged materials were cooled to 100° F. and discharged from the kiln. The discharged materials were screened on a one-quarter inch screen to recover the metallized iron pellets. A total weight of 286.6 grams of pellets having a size of +¼ inch was recovered. The pellets contained 95.8 percent total iron and about 91.6 percent metallic iron. About 95.7 percent of the total iron was metallized. The carbon content of the pellets was 1.2 percent.

In another specific example, about 500 grams of moist iron oxide pellets as described above were soaked in hydrochloric acid waste pickle liquor containing about 25 percent ferrous chloride. The pellets were processed as described above. The total weight of pellets having a size of +¼ inch produced was 285.9 grams. The pellets contained 95.9 percent total iron and about 94.1 percent metallic iron. About 98 percent of the total iron was metallized. The pellets contained 1.24 percent carbon.

In another specific example of the invention, 500 grams of moist iron oxide pellets described above were soaked in an aqueous solution containing 30 percent calcium chloride. The soaked pellets were heated in a rotary kiln as described above. The total weight of the pellets having a size of +¼ inch produced was 312 grams. The pellets contained 91.1 percent total iron and about 86.8 percent metallic iron. About 95.3 percent of the total iron was metallized. The pellets contained 1.70 percent carbon.

In this specification and claims wherever percentages are mentioned, such percentages are on a weight basis unless otherwise noted.

I claim:

1. A process for producing metallized iron pellets comprising:
   a. soda-roasting and leaching iron oxide pellets to remove non-ferrous metal values therefrom,
   b. soaking the soda-roasted and leached iron oxide pellets of step (a), which contain an alkali, in an aqueous solution of at least one chloride taken from the group consisting of ferrous chloride, waste hydrochloric acid pickle liquor and calcium chloride for a time to saturate the soda-roasted and leached iron oxide pellets,
   c. charging the soaked soda-roasted and leached iron oxide pellets of step (b), a desulfurizing agent and a solid carbonaceous reducing agent into a rotary furnace,
   d. heating the charged materials of step (c) to a temperature for a time to reduce not less than 93 percent of the iron oxide to metallic iron, and
   e. discharging the metallized pellets from the rotary furnace and recovering more than 50 percent of said pellets as metallized pellets having a size greater than one-quarter inch mesh size.

2. The process of claim 1 in which the chloride in the aqueous solution of step (b) is waste hydrochloric acid pickle liquor.

3. The process of claim 1 in which the chloride in the aqueous solution of step (b) is ferrous chloride.

4. The process of claim 1 in which the chloride in the aqueous solution of step (b) is calcium chloride.

5. The process of claim 1 in which the amount of the chloride compound in solution is about 16.8 percent to about 30.0 percent.

* * * * *